Feb. 18, 1930.  F. RADIKER  1,747,950
ANIMAL TRAP
Filed May 11, 1929
Fig. 1.
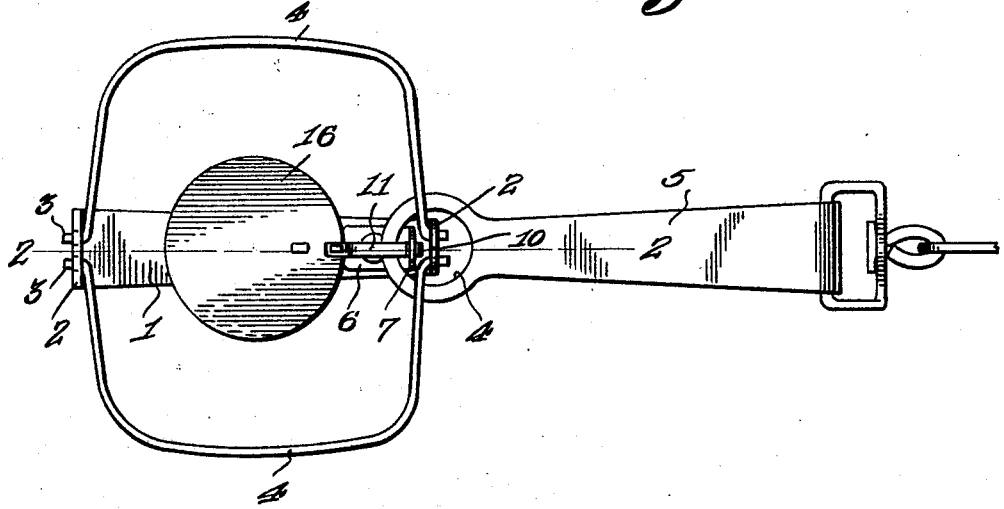
Fig. 2.
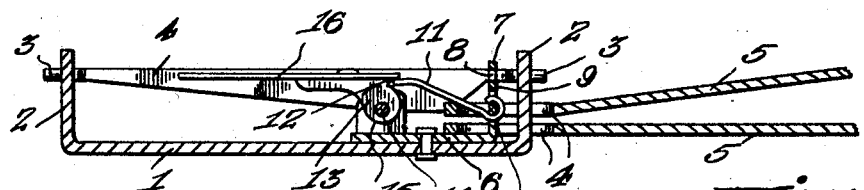
Fig. 3.  Fig. 4.
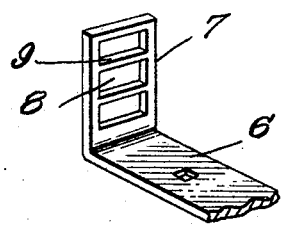 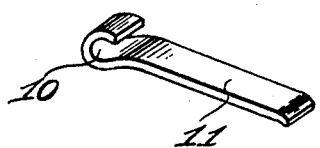
Francis Radiker,
INVENTOR
BY Victor J. Evans
ATTORNEY
WITNESS:

Patented Feb. 18, 1930

1,747,950

UNITED STATES PATENT OFFICE

FRANCIS RADIKER, OF INGRAM, WISCONSIN

ANIMAL TRAP

Application filed May 11, 1929. Serial No. 362,253.

The object of this invention is the provision of a trap for fur bearing animals that is of a construction whereby the same may be set without the necessity of spreading the jaws and the dangers incident thereto and one in which the trigger post has its upper right portion slotted so that the trigger may have one end adjustably connected with any one of the bars between the slots and thereby regulate the elevation of the pan and likewise regulate the tension of the spring for the trap, so that animals of different types may be successfully trapped without danger of breaking the leg of the animal engaged by the jaws of the trap or marring the fur of the animal.

To the attainment of the foregoing and many other objects which will present themselves as the nature of the invention is better understood, the improvement also resides in certain other novel features of construction, combination and operative association of parts, one satisfactory embodiment of which is disclosed by the accompanying drawings.

In the drawings:

Figure 1 is a top plan view of a fur bearing animal trap made in accordance with this invention.

Figure 2 is a sectional view approximately on the line 2—2 of Figure 1.

Figure 3 is a perspective view of the trigger post.

Figure 4 is a similar view of the trigger.

The base 1 of the trap may be of the usual construction, the same having its ends formed with right-angle upstanding portions 2—2, respectively. These upstanding portions are provided with spaced openings for the reception of the offset pintles 3 on the ends of the side members of substantially U-shaped jaws 4. One of the ends 2 of the base receives therethrough the round and elongated openings 4—4 on the inner ends of a substantially U-shaped spring 5 for the trap.

Fixed on the base, adjacent to the end thereof on which the spring 5 is arranged there is the flat or base portion 6 of a trigger post. The end of the plate 6, nearest the said end 2 of the base, is formed with a rightangular upstanding extension 7 that is provided with spaced slots 8 that afford rods 9 therebetween. Any one of these rods is designed to be engaged by the hooked end 10 of a trigger 11, the said trigger passing through the opening 4 in the upper arm of the U-shaped spring 5 and designed to be received in the usual notch 12 of a casting 13 that is pivoted, as at 14, between upstanding ears 15 on the plate 6. The lug or casting 13 carries the pan 16 on the top thereof.

By my improvement it is merely necessary to compress the spring 5 and to swing the trigger to engage in the notch 12 in the pan before swinging the jaws 4 to horizontal or active position. By this simple arrangement it will be apparent that the trap can be set without any liability of injury to the trapper. By adjustably associating the trigger with the trap the pan may be arranged at different elevations and the tension of the upper and active arm of the U-shaped spring 5 can be thus regulated so that the force of contact of the jaws 4 with the legs of an animal can be likewise regulated with the result that the liability of breaking the leg of the animal and thus permitting the animal to escape will be entirely overcome.

The simplicity and advantages of the improvement will be readily apparent to those skilled in the art to which the invention relates without further detailed description, it being merely necessary to state that I do not wish to be restricted to the size, proportion, material employed nor to the precise details herein set forth and hold myself entitled to such changes therefrom as fairly fall within the scope of what I claim.

Having described the invention, I claim:

A trap for fur bearing animals including a base having upstanding ends, a U-shaped spring having openings adjacent the ends thereof arranged over one of the ends, U-shaped jaws having their ends offset and journaled in the upstanding ends of the base, a plate fixed on the base and having an upstanding end which is slotted to provide spaced bars therebetween and said plate having its sides, adjacent its opposite end, formed with upstanding ears, a pan having a casting on its lower end which is pivoted between the ears, and said casting having its rear portion notched, a trigger plate having a hooked end to engage with any of the bars of the trigger post and to be received through the opening in the upper arm of the U-shaped spring and to likewise be received in the notch of the casting.

In testimony whereof I affix my signature.

FRANCIS RADIKER.